E. P. HULTIN.
PUMP FOR INFLATING PNEUMATIC TIRES.
APPLICATION FILED DEC. 22, 1917.
1,349,671.
Patented Aug. 17, 1920.
3 SHEETS—SHEET 1.
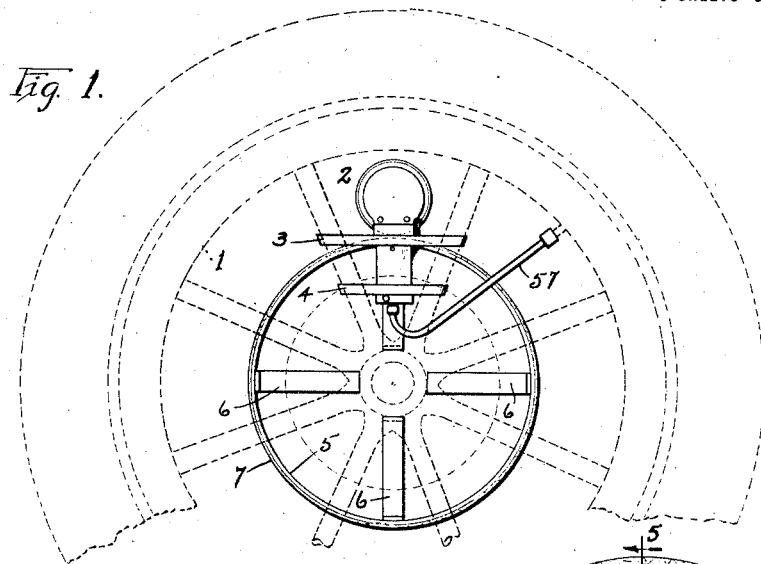
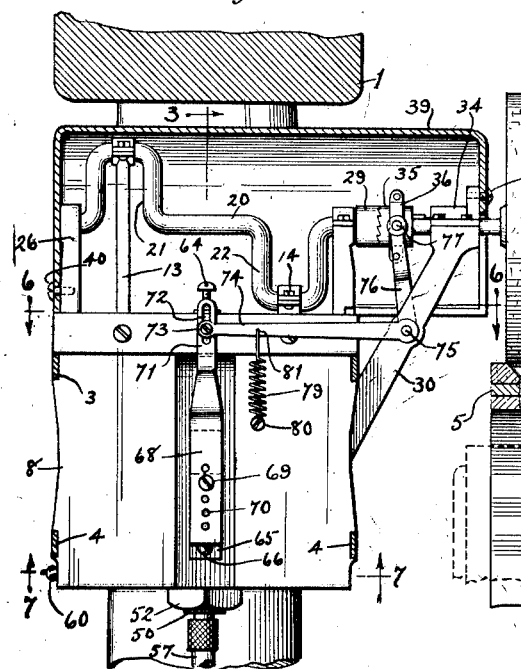
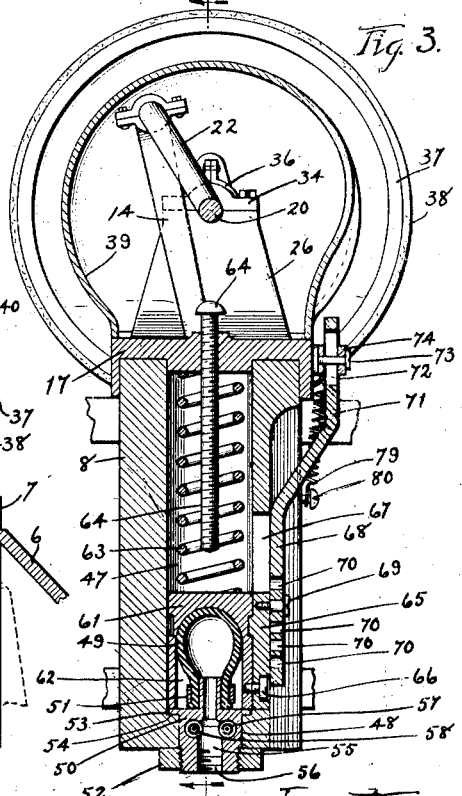
Inventor
Enoch P. Hultin
By Louis C. Vanderlip, Atty.

E. P. HULTIN.
PUMP FOR INFLATING PNEUMATIC TIRES.
APPLICATION FILED DEC. 22, 1917.
1,349,671.
Patented Aug. 17, 1920.
3 SHEETS—SHEET 2.
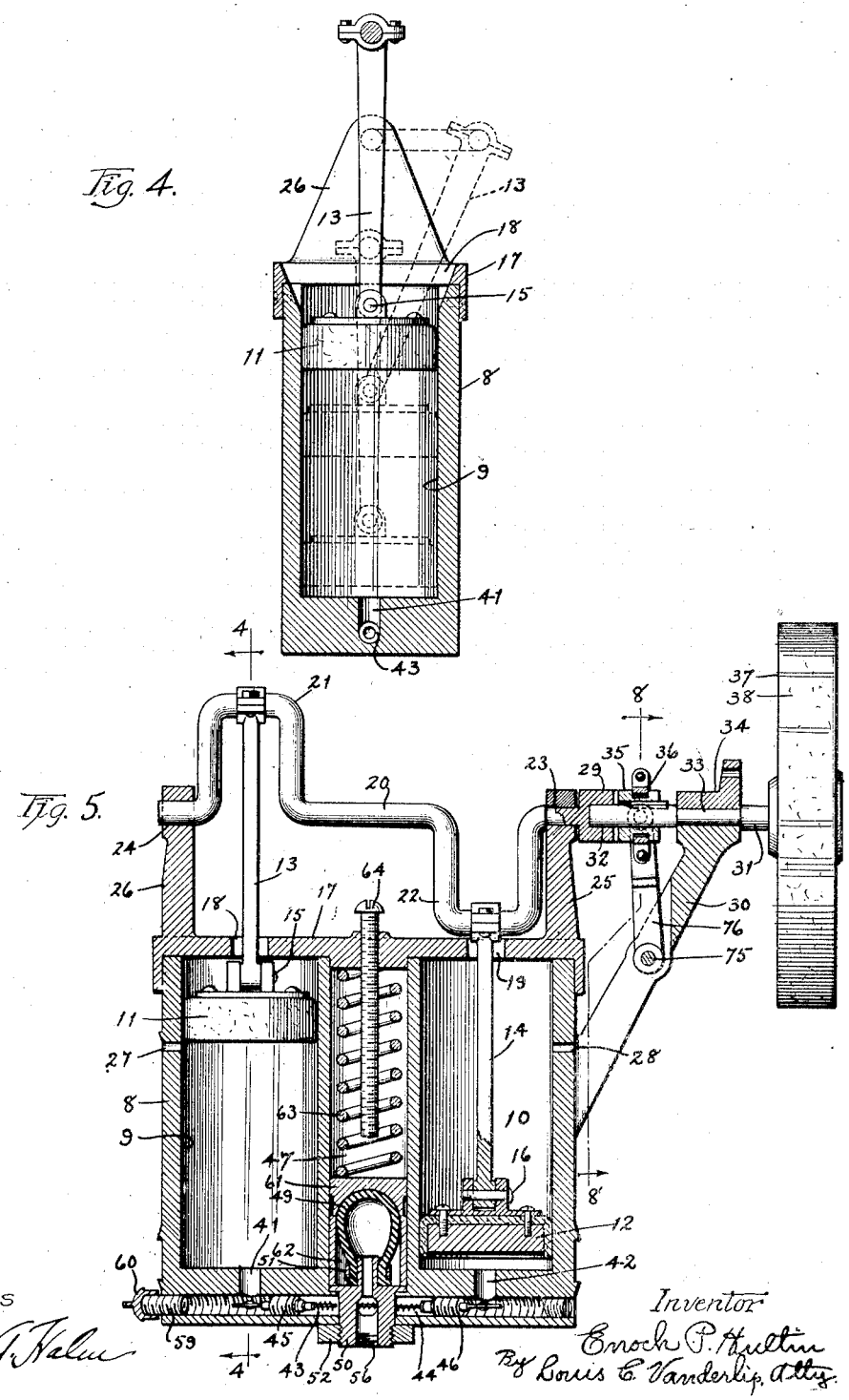

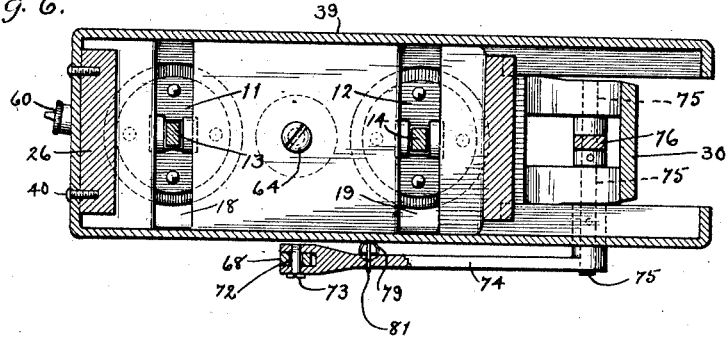
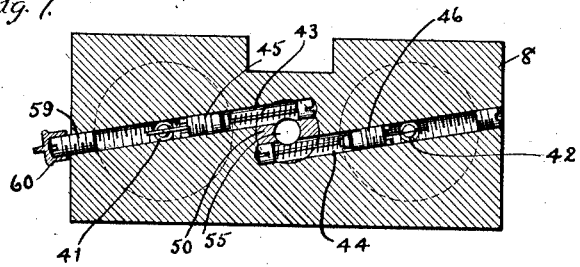
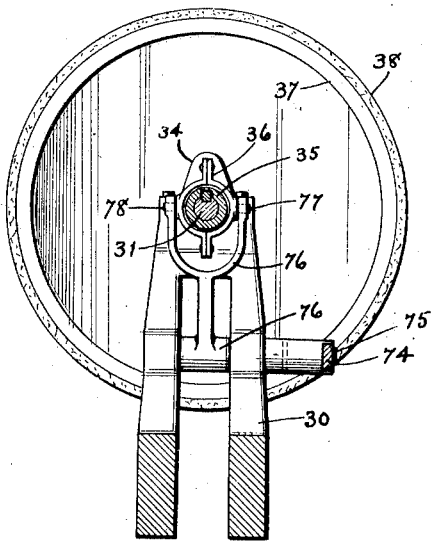

UNITED STATES PATENT OFFICE.

ENOCH P. HULTIN, OF FLINT, MICHIGAN.

PUMP FOR INFLATING PNEUMATIC TIRES.

1,349,671. Specification of Letters Patent. Patented Aug. 17, 1920.

Application filed December 22, 1917. Serial No. 208,365.

*To all whom it may concern:*

Be it known that I, ENOCH P. HULTIN, a citizen of the United States, residing in the city of Flint, Genesee county, State of Michigan, have invented certain new and useful Improvements in Pumps for Inflating Pneumatic Tires, of which the following is a specification.

My invention relates to air pumps, and especially to automatically operated and governed air pumps for inflating pneumatic tires of automobiles, being particularly intended as an improvement to the pump shown and described in my copending patent application, Serial Number 162,515.

The main object of my invention is to provide a simple, positive and cheap driving mechanism for the air pump hereinafter described. Other objects of my invention will be mentioned and described herein.

The preferred embodiment of my invention is well illustrated in the accompanying drawings, in which Figure 1 is a side elevation of an indicated vehicle wheel upon which my invention is mounted; Fig. 2 is a section in side elevation through the pump showing the driving mechanism and clutches; Fig. 3 is a section taken on the line 3—3 of Fig. 2; Fig. 4 is a section taken on the line 4—4 of Fig. 5; Fig. 5 is a section taken on the line 5—5 of Fig. 3; Fig. 6 is a section taken on the line 6—6 of Fig. 2; Fig. 7 is a section taken on the line 7—7 of Fig. 2; and Fig. 8 is a section taken on the line 8—8 of Fig. 5.

Similar numerals of reference indicate similar members and parts of members throughout the several views on the drawings.

Referring to the drawings, in detail, the numeral 1 indicates a motor car wheel having a pneumatic tire mounted thereon and upon which the pump 2, my invention, is mounted, being here shown fastened to the spokes of the wheel by the straps 3 and 4 which are appropriately fastened to the wheel spokes in any suitable manner. The numeral 5 indicates an annular stationary driver band having spider arms 6, 6, the latter being rigidly fastened to the housing of the axle, or to any other suitable fixed member, at their inner ends, said band having a facing or covering 7 of leather, or other suitable material. The numeral 8 indicates a pump body having a plurality of bores 9 and 10 and within which the pump pistons 11 and 12 are reciprocally arranged, said pistons having the piston rods 13 and 14 hinged thereto at 15 and 16, respectively. The numeral 17 indicates a cover member rigidly fastened over the top of the pump body 8 and provided with the apertures 18 and 19 in registration, respectively, with the bores 9 and 10 and adapted to permit the passage of the piston rods 13 and 14. The numeral 20 indicates a driving shaft provided with the cranks 21 and 22, respectively, to which the piston rods 13 and 14, respectively, are operatively connected in any suitable manner, said crank shaft being journaled in the bearing boxes 23 and 24 carried upon the bearing brackets 25 and 26, respectively. Numerals 27 and 28 indicate, respectively, air intake openings formed in the pump body 8, and registering with the pump bores 9 and 10, being adapted to be overrun by the pistons on the outer or suction stroke thereof. The numeral 29 indicates a tooth clutch rigidly carried upon the outer end of the crank shaft 20 and adapted to mesh with a tooth driving clutch, as hereinafter described.

The numeral 30 indicates a driving shaft bracket carried by the pump body 8, a driving shaft 31 being carried thereby at its outer reduced end, or portion, 33 which is journaled in a bearing covered by the bearing box cap 34, the opposite end of said shaft being journaled in a bearing socket 32 formed in the clutch 29 axially with the bearing of the shaft bearing portion 33.

The numeral 35 indicates a tooth clutch member splined to the driving shaft 31 intermediate the shaft bearings and adjacent the clutch 29, said clutch 35 having the conventional clutch shifter collar 36 mounted thereon and being adapted for intermittent engagement with the clutch 29, as hereinafter described.

The numeral 37 indicates a driving pulley rigidly mounted upon the driving shaft 31, provided with a face covering 38 of leather and adapted to engage the leather band, or facing, 7 of the driver band 5 for effecting pulley rotation. The numeral 39 indicates a casing for the driving mechanism, being fastened to suitable members by the screws 40, 40.

The numeral 41 indicates an air discharge port for the pump bore 9 and communicating with the transverse air passage 43, and the numeral 42 indicates an air discharge port placing pump bore 10 in communication with the transverse air passage 44. The numerals 45 and 46 indicate compound check valve members of conventional structure arranged within the air passages 43 and 44, respectively, and adapted to admit air therethrough from the pump cylinders 9 and 10 but to check the return thereof. The numeral 47 indicates the pump governor cylinder disposed intermediate the pump bores 9 and 10 and having its upper end closed by the cover 17, the lower end thereof having a somewhat reduced opening 48.

The numeral 49 indicates an expansible governor bulb, preferably made of substantially pure rubber, which is mounted upon the reduced upper end of the bulb carrier 50 and fastened thereto by the clip 51, said carrier being arranged within the aperture 48 and secured rigidly therein by the nut 52 which is screw threaded upon the lower end of the bulb carrier 50. The numeral 53 indicates an annular flange on the carrier 50 and adapted to form a seal on the shoulder 54 when drawn tightly against said shoulder by the nut 52. The numeral 55 indicates a longitudinal air passage in the carrier 50, in communication with the interior of the bulb 49 and screw threaded at 56 to receive the screw connection of the valveless air hose or conduit 57 which leads to the inner tube of the pneumatic tire.

The numerals 57 and 58 indicate a plurality of transverse passages formed in the bulb carrier 50 on opposite sides of and in communication with the air passage 55 and adapted to place said air passage in communication with the air passages 43 and 44 to admit air to the conduit 57 for tire inflation. The numeral 59 indicates a nipple screw threaded into the outer end of the air passage 43 and adapted to receive the discharge end of a hand, or foot, air pump connection for tire inflation, as an auxiliary inflation device. The numeral 60 indicates a nipple cap screw threaded upon the nipple 59 for closing the same.

The numeral 61 indicates a governor piston slidably disposed within the governor cylinder 47 and provided with the governor bulb chamber 62 within which the bulb 49 is arranged, said piston being normally seated upon the flange 53 of the member 50 by virtue of the exertion of the coil spring 63 disposed within the cylinder 47 above said piston and bearing against the end periphery thereof, the upper end of said spring being seated upon the under side of the cover 17. The tension of the spring 63 is such that the piston 61 is confined upon its seat thereby under low and normal air pressures within the tire, but any pressure in excess of normal, or predetermined, pressure will expand the bulb 49 and actuate said piston off its seat.

The numeral 64 indicates a governor piston stop member screw threaded into the cover 17 and adjustable longitudinally of and within the pump cylinder 47 for limiting the upward travel of the piston 61 to any predetermined limit. The numeral 65 indicates a governor arm bracket carried by and fastened to the piston 61 by a screw 66, said bracket projecting somewhat laterally for slidable disposition within the upright slot 67 formed in the wall of the bore 47 and in communication therewith. The numeral 68 indicates an upright governor arm projecting from and rigidly fastened to the bracket 65 by a screw 69, said arm being provided with a plurality of screw apertures 70, 70 at spaced intervals, each of which is adapted to receive the screw 69, whereby vertical adjustment of said arm may be made for timing the shift of the driving shaft clutch, as hereinafter described, and thereby effecting a variable maximum air pressure in the pneumatic tire. The numeral 71 indicates the upper end of the governor arm 68 which is provided with the elongated slot 72, said slot being adapted to be transversely engaged by the pin 73 which is carried by the forked end of the lever 74, the latter being rigidly mounted at its opposite end upon the shaft 75 journaled in the bracket 30. The numeral 76 indicates a forked clutch shifter lever rigidly mounted upon the shaft 75, the fork ends whereof engage the trunnions 77 and 78 of the clutch collar 36 in the usual manner for effecting a shift of said clutch 35 when the lever 76 is oscillated by the movement of the lever 74. The numeral 79 indicates a lever retraction spring anchored at 80 and connected with the lever 74 at 81 and adapted to normally hold the lever 74 in a retracted condition, whereby the clutches 29 and 35 are normally engaged.

In operation, the interior of the governor bulb 49 is in permanent communication with the interior of the pneumatic tire through the passage 55 and the air tube 57 and, therefore, it is always inflated when the pneumatic tire itself is inflated. When the vehicle wheel rotates the driving pulley 37 is rotated by contact with the band facing 38 around which the pulley moves, thereby rotating the driving shaft 31 and the driving clutch 35 splined thereto.

As the air pressure in the tire increases the bulb 49 is expanded, thereby forcing the piston 61 upward off its seat and compressing the spring 63, said piston movement causing the upward movement of the governor arm 68, whereby the wall of the slot 72 engages the pin 73, thereby oscillating the levers 74 and 76 and effecting a shift of the clutch 35 out of engagement with the clutch 29. Whereupon, the air pumps cease to operate and continue idle until the air pressure in the tire is lowered sufficiently to enable the spring 63 to again gain control of the piston 61, thereby seating the latter upon the flange 53 and thereby restoring the arm 68 to its former position. Thereupon, the coil spring 79 retracts the levers 74 and 76, thereby effecting a reëngagement of the clutches 29 and 35.

As heretofore stated, the apertures 70, 70 formed in the governor arm 68 are adapted to enable the upward and downward adjustment of said arm for regulating and controlling the air pressure in the tire. If a high pressure is desired the arm 68 is adjusted downwardly, said adjustment being accompanied by a corresponding downward adjustment of the stop screw 64. To effect a lower tire pressure, the arm 68 is upwardly adjusted which adjustment is accompanied by a corresponding upward adjustment of the stop screw 64. In either case the adjustment of the stop screw 64 limits the upward travel of the governor 61. And the adjustment of the arm 68 causes an early or late oscillation of the levers 74 and 76 according to the direction of adjustment thereof. Normally, for common pressure in the tire, the pin 73 is positioned approximately midway of the extremities of the slot 72 through the adjustment of the arm 68.

I claim:

1. In a device of the class described, a wheel; a pair of air pump cylinders mounted upon the wheel; pistons operative in said cylinders; a crank shaft; rods operatively connecting the pump pistons with the cranks on said crank shaft; a clutch rigidly mounted upon said crank shaft; a driving shaft; a clutch splined to said driving shaft and normally spring pressed into engagement with said crank shaft clutch; means for rotating said crank shaft; a governor cylinder provided with a lateral opening; a piston movable in said cylinder and spring seated therein; an expansible governor bulb engaging said piston, said bulb being connected with the tire air pressure, whereby said piston is actuated when said bulb is pneumatically expanded in excess of a predetermined pressure; an arm operatively connected with said piston through said governor cylinder lateral opening; and devices connecting said arm and said sliding clutch whereby the clutches are disengaged when said governor piston is actuated by the expansion of the governor bulb.

2. In a device of the class described, a wheel; a pneumatic tire on the wheel; an air pump cylinder mounted upon the wheel; a piston operative in said cylinder; a crank shaft; a rod connecting the pump piston with the crank on said shaft; an air conduit connecting the air pump with the tire; a clutch rigidly mounted upon said crank shaft; a driving shaft; a clutch splined to said driving shaft and normally spring pressed into engagement with said crank shaft clutch; means for rotating said crank shaft; a governor cylinder provided with a lateral opening; a hollow piston movable in said cylinder and resiliently seated therein; an expansible governor bulb arranged within said hollow piston, said bulb being connected with the tire air pressure, whereby said piston is actuated when said bulb is pneumatically expanded in excess of a predetermined pressure; an arm operatively connected with said governor piston through said cylinder lateral opening; and devices connecting said arm and said sliding clutch whereby the clutches are disengaged when said governor piston is actuated by the expansion of the governor bulb.

In testimony whereof I have hereunto affixed my signature this 13 day of December, 1917.

ENOCH P. HULTIN.